United States Patent
Klank et al.

(10) Patent No.: US 6,226,337 B1
(45) Date of Patent: *May 1, 2001

(54) METHOD FOR THE TRANSMISSION OF REFERENCE SIGNALS IN AN OFDM SYSTEM

(75) Inventors: Otto Klank, Lehrte; Jürgen Laabs, Pattensen, both of (DE)

(73) Assignee: Deutsche Thomson-Brandt GmbH, Villingen-Schwenningen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/600,963

(22) PCT Filed: Aug. 31, 1994

(86) PCT No.: PCT/EP94/02884

§ 371 Date: May 30, 1996

§ 102(e) Date: May 30, 1996

(87) PCT Pub. No.: WO95/07581

PCT Pub. Date: Mar. 16, 1995

(30) Foreign Application Priority Data

Sep. 10, 1993 (DE) ................................................ 43 30 665
Sep. 10, 1993 (DE) ................................................ 43 30 672
Mar. 17, 1994 (DE) ................................................ 94104156

(51) Int. Cl.[7] ................................. H04L 7/02; H04L 5/06

(52) U.S. Cl. .......................... 375/367; 375/343; 370/210

(58) Field of Search ................................... 375/140, 142, 375/143, 145, 149, 150, 152, 260, 340, 343, 366, 367, 368; 370/203, 210

(56) References Cited

U.S. PATENT DOCUMENTS

| | | | | |
|---|---|---|---|---|
| 4,881,241 | * | 11/1989 | Pommier et al. | 375/260 |
| 5,452,288 | * | 9/1995 | Rahuel et al. | 370/203 |
| 5,521,943 | * | 5/1996 | Dambacher | 375/295 |
| 5,748,686 | * | 5/1998 | Langberg et al. | 375/367 |
| 5,761,190 | * | 6/1998 | Yamauchi et al. | 370/210 |
| 5,970,397 | * | 10/1999 | Klank et al. | 455/139 |
| 6,035,003 | * | 3/2000 | Park et al. | 375/326 |

FOREIGN PATENT DOCUMENTS

| | | |
|---|---|---|
| 0441731 | 8/1991 | (EP) . |
| 0529421 | 3/1993 | (EP) . |
| 0549445 | 6/1993 | (EP) . |
| 85/03180 | 7/1985 | (WO) . |

OTHER PUBLICATIONS

IEEE Global Telecommunications Conference, Dec. 6–9, 1992, Orlando, U.S.; IEEE New York, US 1992 "A digital modulation method for terrestrial digital TV broadcasting using trellis coded OFDM and its performance", pp. 1694–1698.

* cited by examiner

Primary Examiner—Young T. Tse
(74) Attorney, Agent, or Firm—Joseph S. Tripoli; Robert D. Shedd; Frederick A. Wein (57) ABSTRACT

A method and device in which only a single symbol is required for synchronization, and which permits the detection of appreciable deviations from the normal receiver oscillator frequency or of a deviation of the transmitter frequency from the given frequency pattern, and the correction of the oscillator frequency. The invention further includes an evaluation method for the signal which contains a multiplicity of modulated carriers. In a decoder, additional sequences are evaluated after demodulation and differential reconversion by means of a correlation.

35 Claims, 6 Drawing Sheets

| V | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| $Rc_V$ | 0 | -1 | 1 | 1 | -1 | 1 | 0 | 1 | 0 | -1 | -1 | 1 | 1 | 1 | 0 | 1 |
| $Ic_V$ | 1 | 0 | 0 | 0 | 0 | 0 | -1 | 0 | -1 | 0 | 0 | 0 | 0 | 0 | 1 | 0 |

METHOD FOR THE TRANSMISSION OF REFERENCE SIGNALS IN AN OFDM SYSTEM

The invention relates to a method for digital signal transmission in frames using a multiplicity of modulated carriers, to corresponding evaluation methods for this signal and to a corresponding device for decoding.

Prior Art

Various methods for terrestrial transmission of digital broadcast signals are known, such as OFDM, QPSK and QAM modulation. One of the main problems connected with such systems is synchronization when a receiver is switched on or tuned to another channel.

A synchronization method of this type for DAB (Digital Audio Broadcasting) is known, in which a complete zero symbol and a so-called TFPC (Time Frequency Phase Control) symbol are successively transmitted and are evaluated in a specific manner in the receiver. In the same way as the signal currents of the useful information to be transmitted, the TFPC symbol is assigned to the individual carriers or frequencies of the OFDM multi-carrier method. For the purpose of evaluation, the samples are transformed into a frequency representation and evaluated in that form, and the results are transformed back into the time domain. A COFDM modulation method of this type is described in DE-A-4128713.

Invention

The invention is based on the object of specifying a method in which only a single symbol is required for the synchronization and which permits the detection of appreciable deviations from the normal receiver oscillator frequency or of a deviation of the transmitter frequency from the given frequency pattern, and the correction of the oscillator frequency.

The invention is based on the further object of specifying an evaluation method for the signal transmitted according to the invention.

The invention is based on the further object of specifying a device for the application of the method according to the invention.

The transmitted signal contains a multiplicity of modulated carriers (OFDM modulation, which is described, for example, in "Data transmission by frequency division multiplexing using the discrete Fourier transform", Weinstein, S. B. et al., IEEE Transactions on Communication Technology, Vol. COM-19, No. 15, October 1971 and in "An orthogonally multiplexed QAM system using the discrete Fourier transform", Hirosaki, B., IEEE Transactions on Communication Technology, Vol. COM-29, No. 7, July 1981). QPSK and/or QAM modulation can be used, for example, for these carriers. A specific amount of the entire channel capacity is reserved for the synchronization and the channel estimation/correction data.

In the case of the solution according to the invention, the power of the signal is zero or virtually zero for part of the duration of the synchronization symbol. During a further time segment, it is possible to apply a modulation method which differs from the OFDM method used in the remaining part. The modulation of this part contains at least one sequence having optimum autocorrelation properties, for example an M sequence, i.e. PRN sequence of maximum length, or a specific number of so-called CAZAC sequences (constant amplitude zero autocorrelation). CAZAC sequences of this type are described in EP-A-0529421.

This bit sequence which is defined in temporal order and is modulated onto a centrally positioned carrier can be transmitted instead of an information sequence assigned to the frequencies, the spacing between the bits of the sequence or sequences corresponding to the time intervals used when (over)sampling the OFDM symbols, or to a multiple of these time intervals, or only every other carrier is used for half the effective symbol length.

The length of the part with zero power corresponds to approximately half the (OFDM) symbol duration, as a result of which one sequence has the length of approximately a quarter of the symbol. If, for example in the case of a TV transmission method, 1900 of 2048 possible carriers (length of the FFT/Fast Fourier Transform) are effectively utilized, then this yields 950 usable carriers for the signal part of the synchronization symbol. As a result, an M sequence having a length of 512-1 can be transmitted about 1.85 times. Each value of the sequence (for example 0 or 1) is assigned a carrier phase angle, for example 0° and 180° in the case of QPSK. Another carrier phase assignment is expediently selected for the component of 1.85−1=0.85 or 85% of the second sequence. For a higher-level QAM, for example 64 QAM in the case of TV transmission, only the basic values corresponding to a QPSK system are used for the signal components of the synchronization symbol, i.e. four phase angles which differ by 90° and have a constant amplitude.

In the case of QPSK modulation, the sequences can be transmitted only in a subchannel (I or Q) and the data sequence in the other subchannel is constant. In a different solution, the sequences are transmitted in both subchannels (I and Q), but with different signs (0 and 1). In the case of a higher-level QAM or a so-called multi-resolution QAM, the modulation of the synchronization signal then takes place at the lowest level, i.e. on a QPSK basis.

The proposed division of the synchronization symbol has the advantage that the zero component and the actual signal component of the sync symbol each take up about half the symbol duration. In the event of multipath reception, it is still possible to identify delay time differences up to the duration of the effective sequence, that is to say up to the length of the signal component and thus up to half the symbol duration. This duration is generally longer than the length of the guard interval used, thereby achieving comparable or even slightly improved protection from multipath propagation. During the zero component, it is possible additionally to transmit a reduced number of carriers for transmitter identification with a power which is in total so low that the detection of the zero component in the receiver is not significantly affected thereby. For optimum selection of the relationships between the frame length, the number of useful symbols per frame and the sampling sequence, the length of the synchronization symbol can be selected to deviate slightly from the duration of the OFDM symbols, the zero component being somewhat shortened or lengthened in the said synchronization symbol.

In order to achieve reduced computing complexity in the receiver and in order to permit a specific form of evaluation in the receiver, a significantly shorter sequence can be selected and transmitted correspondingly frequently.

The spacing between the bits of the sequence can correspond here to n times the value of the time intervals used during the oversampling of the OFDM symbols, designated below as n spacing.

CAZAC sequences having a length of 16 are preferably used, which means a 59.4-fold repetition in the case of the 950 usable carriers. Since the repetition of precisely identical arrangements would lead to ambiguities during correlation evaluation, the following sequences are modified by a different selection of the assignment to the modulation angles and by adding constant angular changes. Each newly obtained sequence is transmitted twice for reasons of unambiguity in correlation, thereby producing a total of 29 pairs and a single sequence in the case of the example chosen. The modulation can also be carried out differentially instead of directly via the carrier sequence. A more detailed description is contained in DE-A-4128713.

In a receiver for this method, rough synchronization takes place on the basis of the part-symbol with zero power in that, for example, synchronization pulses are derived by rectification and filtering of the received signal, which is converted into baseband, and are used for defining the frame start or symbol window. After this, the evaluation of the signal component of the received synchronization symbol takes place on the basis of the rough synchronization, and afterwards a more precise determination of the time occupied by the symbol or symbols is undertaken.

For this purpose, as in the case of the signal component of the useful information, the signal sampled in a temporal sequence is transformed by an FFT into a representation in the frequency domain, is complex-conjugate multiplied (corresponds to a real division) in that form by the corresponding desired sequence—stored in the receiver—and the result is subsequently transformed back into the time representation. This result represents the channel impulse response, according to which the time period (symbol window) to be sampled per symbol is defined in such a way that as many components of the impulse response as possible are included. For this purpose, a counter which is running in synchronism with the frame is correspondingly incremented or decremented.

Correlation of the signal part, which is transformed into the frequency representation, of the synchronization symbol and of the desired sequence stored in the receiver and subsequent computational evaluation supply information concerning the frequency deviation of the received signal which is converted to a different frequency (for example baseband), which frequency deviation is used, after digital-to-analog conversion and filtering, for the frequency control of the local oscillator. In the case of repeated transmission of sequences of shorter length, the results following the FFT are converted in sections to the basic form of the sequence and averaged in sections, and only a correlation using a shorter length is then carried out.

In the case of the n spacing, a correlation of the received sequence with the stored desired sequence is carried out for the purpose of evaluation. The correlation result represents the channel impulse response, according to which the time period (symbol window) to be sampled per symbol is defined in such a way that as many of the components of the channel impulse response as possible are included.

In the event of extended transmission of shorter sequences, use is preferably made in the receiver, during correlation, of only every nth value of the sampling which is carried out with an unchanged sequence. As an alternative, n correlations are carried out in the receiver with sequences offset by one to n sampling intervals, in the case of which only every nth value obtained is used. In this case, either only the result with the highest peak value is used further, or the results of n correlations are averaged. In principle, it is also possible even to perform averaging of the respective n samples, the correlation then being carried out with the results.

The correlation or correlations can be realized in this case, too, by transformation of the received sequence into a frequency representation, complex-conjugate multiplication by a corresponding desired sequence and inverse transformation. An advantageous design is produced in this case, too, if the zero component and the actual signal component of the sync symbol each take up about half the symbol duration, because, with multipath reception, permissible delay times are those up to the duration of the effective sequence length, that is to say, with double transmission, up to half the length of the signal component, and thus a quarter of the sync symbol duration, and this duration corresponds approximately to the guard interval which is customarily used.

The transmitted signal can contain a time frequency phase reference symbol, which is modulated by a specific number of CAZAC sequences (constant amplitude zero autocorrelation). A further reference symbol, which is modulated at least by a pseudorandom sequence having a greater length than any of the said CAZAC sequences, is then additionally transmitted in each frame.

In a further embodiment of the invention, some of the CAZAC sequences of the time frequency phase reference symbol mentioned first of all are replaced by at least one pseudorandom sequence having a greater length than any of the said CAZAC sequences, such larger sequences preferably being arranged in the outer carriers, that is to say at the lowest and highest frequencies.

The pseudorandom sequences can be encoded in a differential mode. The code words are advantageously modulated onto the carriers using QPSK.

The pseudorandom sequences can have an optimum autocorrelation characteristic (for example M sequences), for example by using a maximum length of $2^{n-1}$.

In a decoder, such additional sequences are evaluated, after demodulation (including FFT) and differential reconversion, by means of a correlation. The CAZAC sequences are evaluated in the manner described in EP-A-0529421.

The resulting information can be used to correct the following:
the frequency of at least one of the oscillators which are used for frequency conversion in the receiver;
or, in a similar arrangement, for example a multiplier;
or, in the case of PLL-controlled oscillators, for the correction of the reference oscillator.

The additional pseudorandom sequences serve as extended area information and enable significant deviations of the normal receiver oscillator frequency to be determined and corrected or the oscillator frequency to be determined and corrected if the transmitter frequency deviates from a predetermined pattern (offset).

The transmitted pseudorandom sequences are evaluated even further after the required oscillator or frequency conversion accuracy is achieved. However, this result can also have no effect provided a defined deviation range is not exceeded.

As a further feature, it is possible to use, within a frame, a plurality of symbols which are modulated by the CAZAC sequences and the additional pseudorandom sequences.

The reference symbols can advantageously serve as time frequency phase symbols.

Both of the above-described types of reference symbols can be used together with further special symbols or pilot cells which are defined by a carrier and a time window or a time symbol, that is to say which occupy only some of the carriers at specific time periods, in order to determine the channel status and for subsequent channel correction.

In principle, the method according to the invention is suitable for digital signal transmission in frames using a multiplicity of modulated carriers, a zero symbol and a time frequency phase reference symbol which is modulated using CAZAC sequences, either at least one further reference symbol, which is modulated by at least one pseudorandom sequence having a greater length than any of the said CAZAC sequences, being transmitted within a frame or the said time frequency phase reference symbol is also modulated by at least one pseudorandom sequence having a greater length than any of the said CAZAC sequences, these sequences having a greater length being arranged essentially in the outer carriers, that is to say at the lowest and at the highest carrier frequencies.

Advantageous developments of the method according to the invention emerge from the associated dependent claims.

In principle, the device according to the invention for decoding a digital signal transmitted by the method according to the invention contains:

demodulation means for demodulating the received signal;

downstream zero signal component detector means for detecting the zero symbol;

OFDM decoder means for the demodulated received signal;

digital synchronization evaluation means for the demodulated received signal, which are controlled by an output signal of the zero signal component detector means and which control the OFDM decoder means and additionally evaluate either the further reference symbol which is modulated by at least one pseudorandom sequence having a greater length than any of the CAZAC sequences, or the time frequency phase reference signal, which is also modulated by at least one pseudorandom sequence having a greater length than any of the CAZAC sequences, these sequences having a greater length being arranged essentially in the outer carriers, that is to say at the lowest and at the highest carrier frequencies.

Advantageous developments of the device according to the invention emerge from the associated dependent claims.

DRAWINGS

Exemplary embodiments of the invention are described with reference to the drawings, in which.

EXEMPLARY EMBODIMENTS

Figure 1:
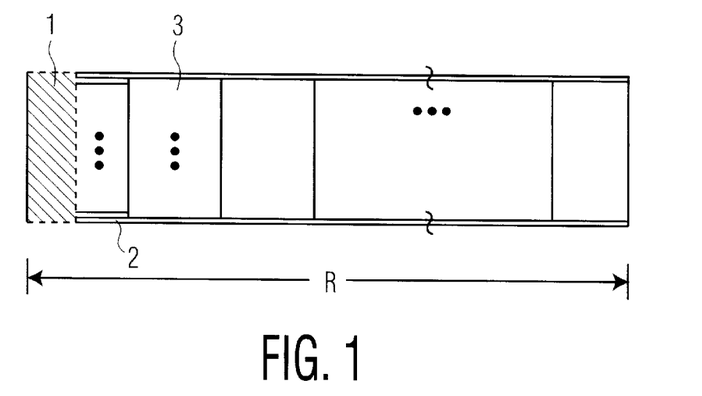
FIG. 1 shows the signal structure.

In FIG. 1, the entire frame R first of all contains the hatched component 1 with 0 or approximately 0 power, then the signal component 2 of the synchronization symbol with the modulation which differs from the useful signal, 1+2 constituting the entire sync symbol. There then follows the section 3 with the OFDM symbols for the useful data.

Figure 2:
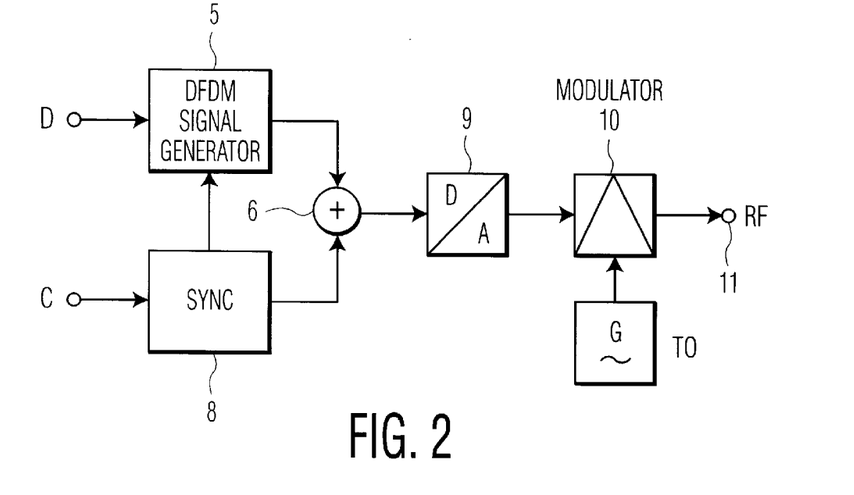
FIG. 2 shows a block diagram for the transmitter end.

In the OFDM signal generator 5 of FIG. 2, an OFDM baseband signal is generated with the aid of the useful data stream D (for example television video data). In the sync stage 8, the synchronization symbol, comprising the zero components and the signal component (sequence), is generated in baseband from the clock signal C. The synchronism between the signals of the stages 5 and 8 is established in that a clock and window signal originating in the stage 8 controls the signal timing in the stage 5. The two baseband signal components which are generated are combined in the adder stage 6. The output signal of the adder stage 6, containing the OFDM signal and the sync symbol, is fed to the modulator 10 via the D/A converter 9. The said modulator supplies the modulated RF (radio-frequency) signal at the terminal 11. The carrier signal to be modulated is fed to the modulator 10 by the carrier oscillator TO.

Figure 3:
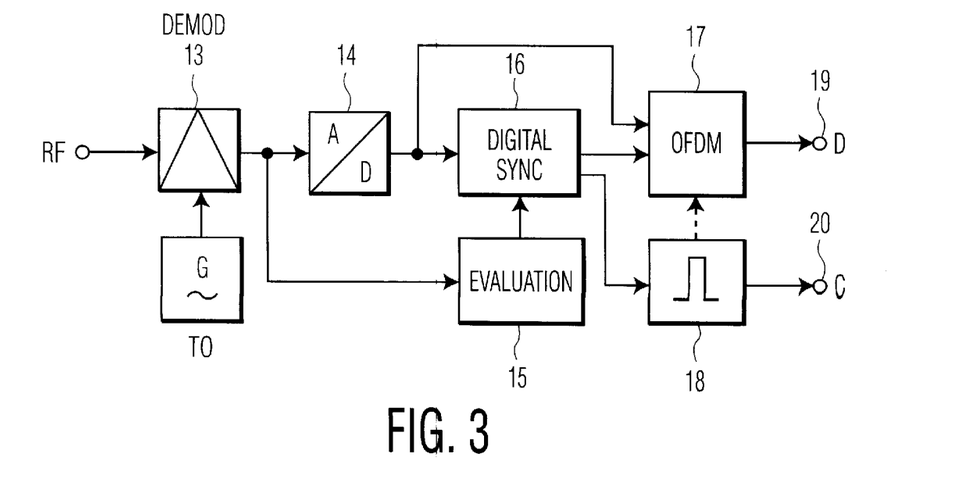
FIG. 3 shows a block diagram for the receiver end.

In the demodulator stage 13 of FIG. 3, the received RF signal is down-converted to baseband with the aid of the signal arriving from the oscillator TO. The output signal of the stage 13 passes, on the one hand, to the A/D converter 14 and, on the other hand, to the circuit 15 for evaluating the zero component, the result of which is used for controlling the evaluation of the signal component of the synchronization symbol in a digital synchronization stage 16. The latter receives for this purpose the output signal of the A/D converter 14, which output signal is additionally passed to the OFDM signal processing circuit 17. The frame start and symbol window output of the stage 16 controls the circuit 17. In addition, the synchronization component of the output signal controls the clock generator 18, which in turn generates the required control signals for the circuit 17. The data signal D is then available again at the terminal 19 and the clock signal C for the timing of the reproduction circuit is available at the terminal 20.

Figure 4:
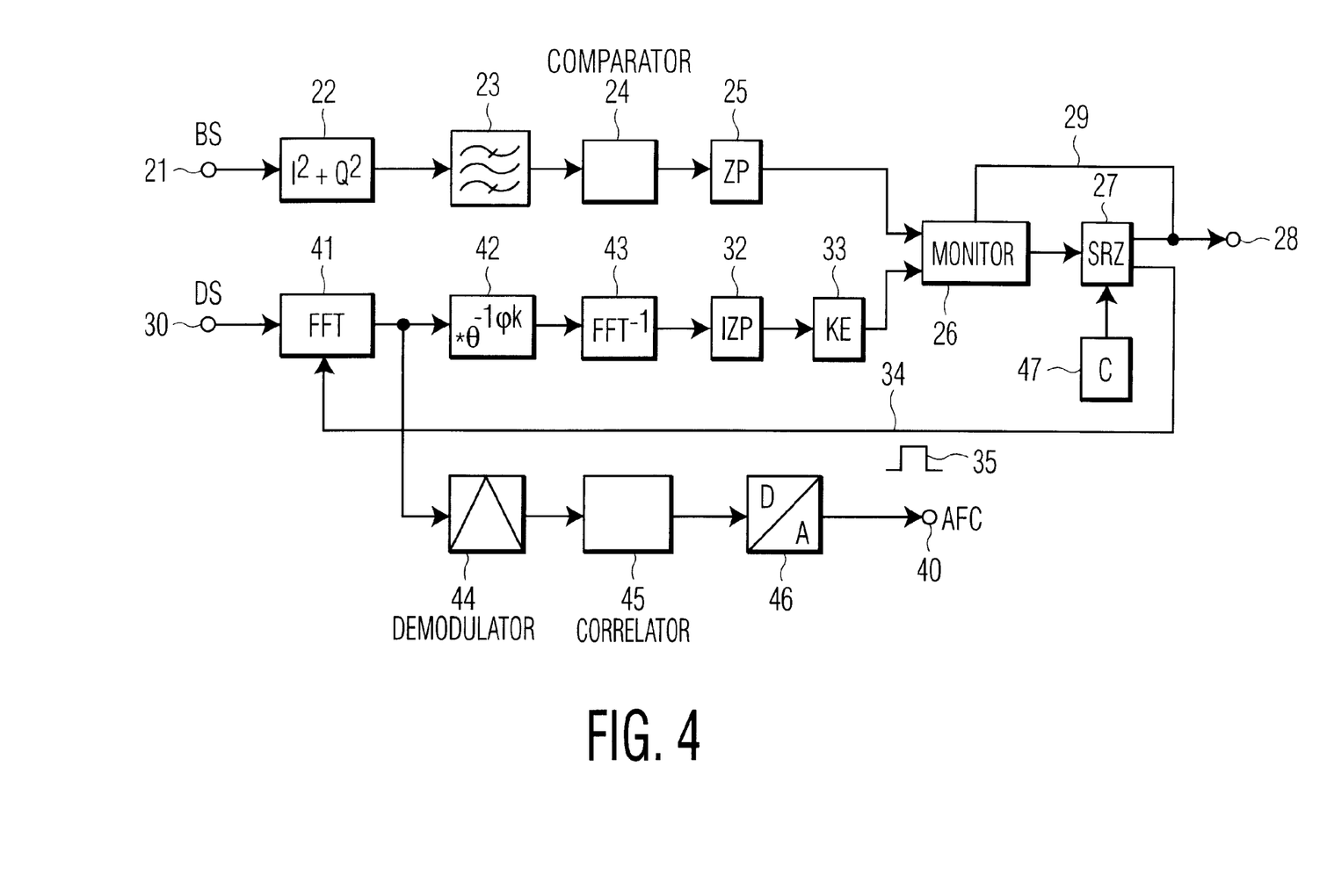
FIG. 4 shows a block diagram for receiver synchronization in the case of n spacing.

FIG. 4 shows a block diagram for the receiver synchronization. The baseband signal BS passes from the terminal 21 to the input of the $I^2+Q^2$ stage 22, the output of which is connected via the filter 23 and the comparator 24 to the input of the circuit 25 for timing. In this case, the squares of the signal components I and Q are summed, filtered and compared with a threshold value in the comparator 24. The result is a synchronization pulse which corresponds to the zero component and for which provisional points in time for the frame start and for the symbol windows are determined in the circuit 25. The output signal of the circuit 25 passes to the first input of the circuit 26 for sync monitoring, the output of which is connected to the input of the symbol/frame counter 27. The digital sync symbol DS passes from the terminal 30 to the input of the correlator 31 in which, timed by the window signal 35, the correlation of the received data sequence and the stored desired sequence is carried out. The result is a temporal sequence of data values which represents the channel impulse response. Using this signal, precise timing of the frame start and of the symbol windows takes place in the integration and positioning circuit 32. Depending on whether the signal temporally leads or lags the preliminary frame, corresponding positioning information is formed in the stage 33 and forwarded to the frame counter via the sync monitoring circuit 26.

The output terminal 28 of the circuit 27 supplies the signal for the frame start and the symbol window and is additionally fed back via the line 29 to a further input of the circuit 26. A second output of the circuit 27 supplies, via the line 34, the window signal 35 for the correlator 31. The clock signal C from the clock generator is applied to the control input 36 of the circuit 27.

Figure 5:
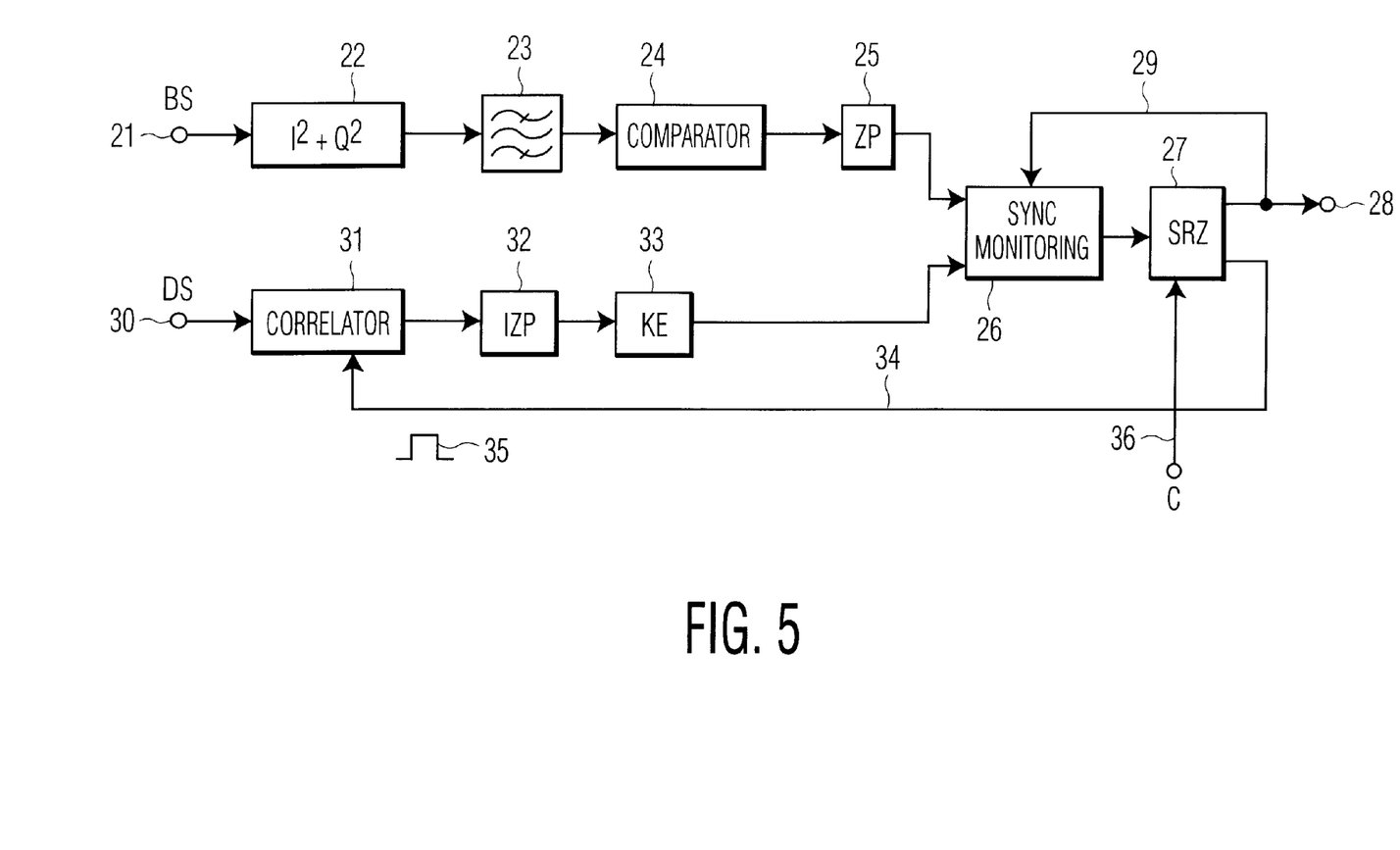
FIG. 5 shows a further block diagram for receiver synchronization.

In FIG. 5, the baseband signal BS passes from the terminal 21 to the input of the $I^2+Q^2$ stage 22, the output of which is connected via the filter 23 and the comparator 24 to the input of the circuit 25 for the timing. In this case, the squares of the signal components I and Q are summed, filtered and compared with a threshold value in the comparator 24. The result is a synchronization pulse which corresponds to the zero component and for which provisional points in time for the frame start and for the symbol windows are determined in the circuit 25. The output signal of the circuit 25 passes to the first input of the circuit 26 for sync monitoring, the output of which is connected to the input of the symbol/frame counter 27.

The digitized sync signal DS from the terminal 30 is transformed by the FFT circuit 41 into a representation in the frequency domain, and is then complex-conjugate multiplied in the stage 42 by the corresponding desired sequence stored in the receiver, which corresponds to a real division. The result of the stage 42 is subsequently transformed back into the time representation in the $FFT^{-1}$ stage 43 again. The signal from the output of the stage 43 passes to the stage 32, which effects integration and timing. The signal from the output of the stage 32 passes to the stage 33 for correction determination and is then fed to the second input of the stage 26.

The signal from the output of the stage 41 additionally passes to the differential demodulator 44 and, following the differential demodulation carried out over the frequency or carrier sequence, to the correlator 45. The output signal of the correlator 45 is converted in the D/A converter/filter 46 into an AFC signal present at the terminal 40 and is used for the frequency control of the local oscillator.

The symbol/frame counter 27 receives the clock signal from the clock generator 47. One output of the symbol/frame counter 27 supplies, via the line 34, the sync symbol window pulse 35 to the FFT stage 41. The control signal for the frame start and symbol window is extracted via a further output of the counter 27.

In the following part of the description, which relates to the distribution and the modulation of reference symbols and reference cells, the zero symbol (or the symbol with a zero component) bears the number "0", and the data and the reference symbols of a frame are numbered with A=1, B, C, D, E, F and G.

First Mode

Figure 6:
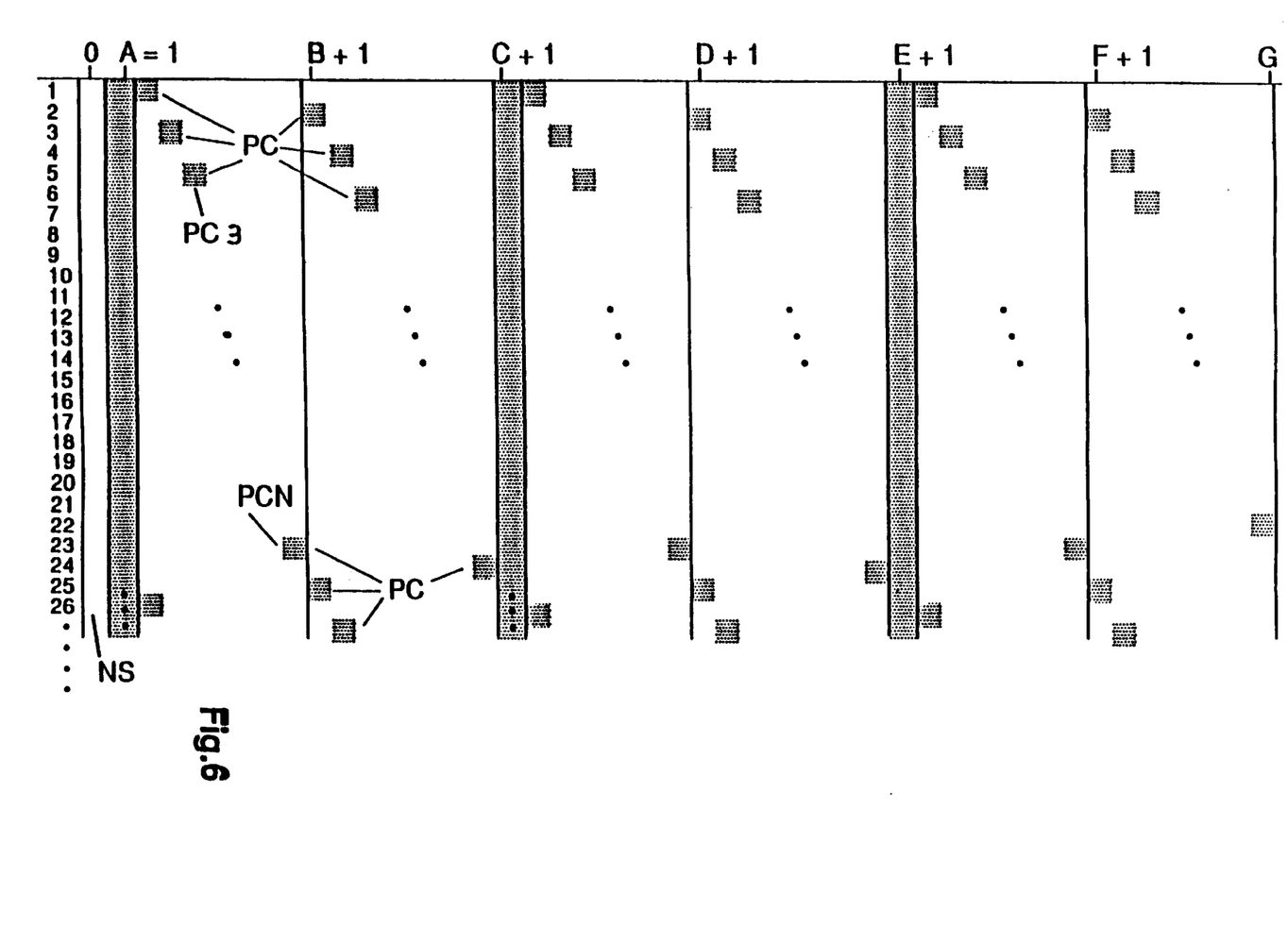
FIG. 6 shows an arrangement of synchronization and reference symbols and pilot cells in a first mode.

FIG. 6 shows in the horizontal direction symbols within a frame and carrier numbers 1 . . . 26 . . . in the vertical direction. Arranged at the left-hand edge is a zero symbol NS for synchronization purposes. The symbols A, C+1 and E+1 serve as reference symbols. Pilot cells PC are arranged at uniform spacings over the two-dimensional plane, that is to say the sequence of pilot cells is correspondingly continued between PC3 and PCN. Approximately 2000 carriers are used.

Each reference symbol is QPSK-modulated with a combination of two M sequences (sequences of maximum length) having a length of 255 and a set of 44 doubled CAZAC sequences having a length of (2 times) 16. The M sequences are characterized by the generator polynomials 717 oct. and 747 oct., are differentially encoded and arranged at the "outer" parts of the carrier positions (at the lowest and the highest frequencies). The CAZAC sequences are derived from a basic or source CAZAC sequence by rotation by n * π/2, and by differential encoding (over the frequency), by doubling (the same frequency twice one after the other) and by adding phase shifts of n times π/2. 22 of these sequences are arranged below the centre frequency of the signal and the other 22 sequences are arranged above the centre frequency of the signal.

Figure 10:
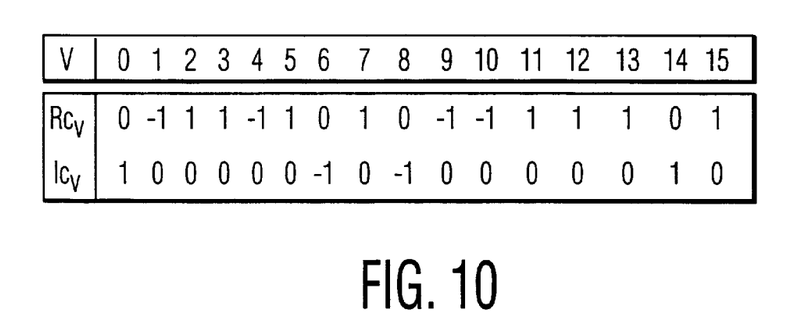
FIG. 10 shows a basic CAZAC sequence.

FIG. 10 shows a basic/source CAZAC sequence having a length of 16, by which the real part and the imaginary part of $c_v$ are defined.

The arrangement in pairs permits correlation to be carried out in the receiver without any interference from the (different) adjacent sequences. In this case, only the middle part of the doubled sequences is used.

The aim is to obtain within the time period a unit pulse response which is as clear and definitive as possible.

The complete set of sequences in each reference symbol is identified by approximately optimum autocorrelation properties within a range of ±20 shifts or ±20 carriers, account also being taken of critical conditions, such as an offset by half the carrier spacing.

The positions i and k of the pilot cells $S_{i,k}$, where i is the symbol number and k is the carrier number, are defined by the following equations:

1st set:
i=(n)mod(L−1)+L*m +2; k=2*n+1
2nd set:
i=(n+(L−1)/2)mod(L−1)+L*m+2; k=2*n+2 where n=0, 2 . . . M/2−1; n=0, 1, 2. L may be equal to C and M is a number somewhat less than the total number of carriers. Cells with i=G+1 are shifted at the same carrier position according to i=G, and results where k>m are omitted.

The pilot cells are modulated using fixed phases and amplitudes, for example by means of QPSK modulation.

The modulation can be selected to be identical to that of the reference symbols, which means that each cell at the position of the carrier k has the same modulation as the cell at the position of the carrier k in the reference symbol.

The total number of defined cells has a capacity of, for example, (G+1)/L complete symbols. This yields a total of a correspondingly doubled number of symbols for the reference signals and an additional symbol if the zero symbol has run into this number.

Second Mode

Figure 7:
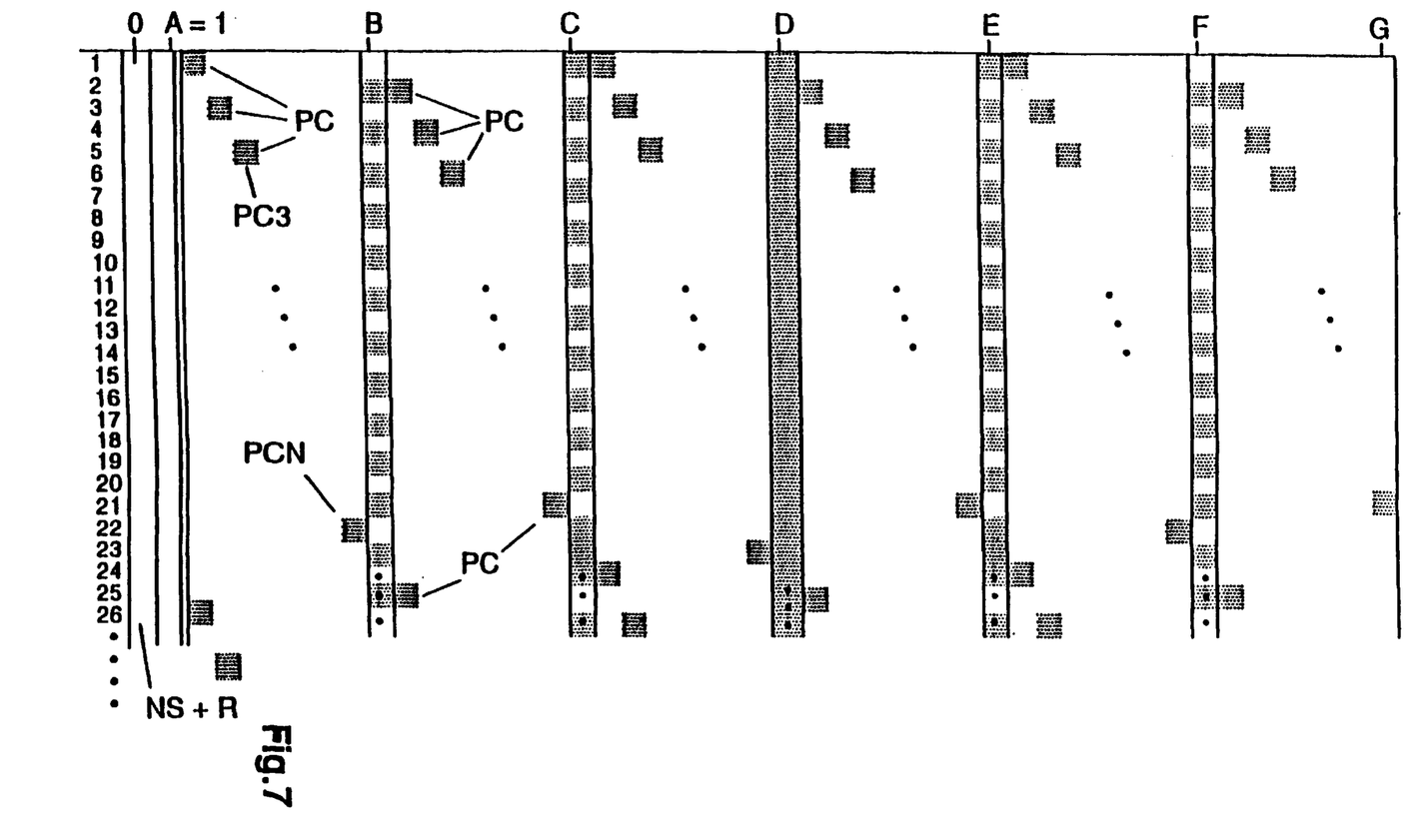
FIG. 7 shows an arrangement of synchronization and reference symbols and pilot cells in a second mode.

FIG. 7 shows in the horizontal direction symbols within a frame and carrier numbers 1 . . . 26 . . . in the vertical direction. Arranged at the left-hand edge is a first symbol NS+R. Pilot cells PC are distributed at regular spacings over the two-dimensional plane, that is to say the sequence of pilot cells is correspondingly continued between PC3 and PCN. Approximately 8000 carriers are used, for example.

The first symbol NS+R (number 0) is split into two time periods, a part with 0 power (zero signal component) and an active part, which contains the OFDM-modulated "reference" signal having half the length of the OFDM data symbols. The carrier spacing is accordingly doubled, which results in approximately 4000 carriers. The active part of the symbol 0 and some of the symbols B, C, D, E, F are used as a reference symbol. The use of the carriers, numbered from 1 to 8000, for example, within these symbols is as follows:

active part of the symbol 0: all of the carriers (spacing doubled); positions identical to those of the odd carriers in the other symbols;

symbols B and F: even carriers;
symbols C and E: odd carriers;
symbol D: all of the carriers.

The remaining time slots or cells of the reference symbols are used for the transmission of signal data (user data). This corresponds to the use of the capacity of (G+1)/L (complete) symbols per frame
the signal part derived from the symbol 0 not being counted in or being included in the calculation as the zero symbol. In this way, the overhead for the reference symbols is the same as in the 1st mode described above.

The active part of the symbols 0 and D is modulated by means of QPSK with a combination of M sequences (sequences of maximum length) having a length of 511 and a set of CAZAC sequences having a length of 16. Two M sequences and 88 doubled CAZAC sequences are used for the symbol 0; the corresponding values for the symbol D are four M sequences and 176 doubled CAZAC sequences. The remaining reference symbols B, C, E and F are modulated with fixed phases and amplitudes, for example by means of QPSK modulation.

The M sequences can use the generator polynomials 1725 oct., 1257 oct., 1423 oct. and 1443 oct., which are differentially encoded (over the frequency) and are arranged at the outer part of the carrier positions (lowest and highest frequencies). The CAZAC sequences are derived in the manner described in conjunction with the 1st mode. These sequences are arranged symmetrically below and above the centre frequency of the signal. The complete set of sequences in the first reference symbol is characterized by approximately optimum autocorrelation properties within a range of at least ±40 shifts corresponding to ±80 carriers having a spacing of 1 kHz, account also being taken of critical conditions such as offsets by half the carrier spacing. Similar conditions are met by the reference symbol with the number D. The basic sequences used and the source sequence are the same as for the 1st mode. The arrangement within the symbols may vary.

Figure 8:
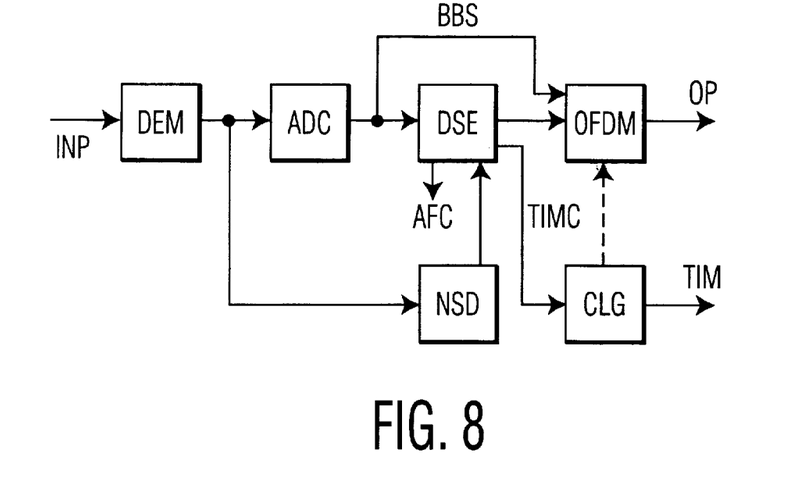
FIG. 8 shows a further block diagram of a receiver according to the invention.

In FIG. 8, a received or previously received and stored input signal INP is demodulated in a demodulator circuit DEM. The time synchronization in the receiver begins with the detection of the zero symbol in a downstream zero signal component detector NSD, which carries out an envelope calculation, matched filtering and a centre calculation. This can be effected either by means of analog/digital or purely digital processing. Following the A/D conversion in ADC, the output signal of the demodulator DEM passes as a baseband signal BBS to an OFDM decoder OFDM, which supplies the final output signal OP, and to a digital synchronization evaluator DSE, which controls OFDM and supplies control data to a clock generator CLG. CLG clocks OFDM and the output time signals TIM.

Figure 9:
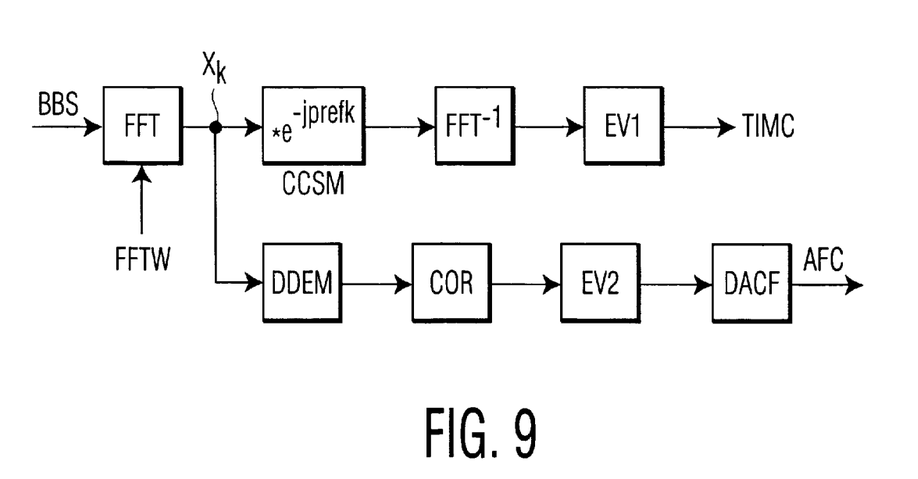
FIG. 9 shows a detailed block diagram for the digital synchronization in FIG. 8.

According to FIG. 9, time synchronization and frequency synchronization are carried out in parallel in the frequency domain in the DSE. The FFT processing (fast Fourier transform) in the circuit FFT is started with a window, based on the detected zero symbol or a zero signal component. In the section for time synchronization, the signals $X_k$ from FFT pass via a complex-conjugate sequence multiplier CCSM and an inverse FFT circuit $FFT^{-1}$ to a first evaluation circuit EV1. The first reference symbol of the frame is evaluated in these circuits as a time reference. The operation may be regarded as equivalent to a correlation in the time domain and supplies the channel impulse response. The position of the first or main impulse TIMC in relation to the preceding FFT window or frame start is used for the fine adjustment FFTW of the FFT window and of the clock generator CLG.

In EV1, a frame synchronization counter, which is controlled by the impulses derived from the channel impulse response, supplies the frame start and other time information TIMC, the symbol starts, FFT window and the sampling rate being derived, for example, by dividing the time periods between the frame starting points.

The frequency synchronization begins with a rough estimation of the frequency offset of the A/D-converted and FFT-transformed baseband signal BBS. The (transformed) signal $X_k$ is differentially decoded in the differential demodulator DDEM and a correlation of the M sequence component of the reference symbol with the reference sequences stored—for example in COR—is carried out in COR over at least ±20 carrier shifts from the expected centre point. The results from different sequences are averaged in a downstream second evaluation circuit EV2. The resulting deviation of the maximum from the expected centre point is converted in the D/A converter DACF and filtered to form an equivalent analog value AFC, and then used for correction, for example of the offset of the mixing oscillator or of the mixing oscillators in the RF section upstream of the demodulator DEM. These method steps are repeated until a deviation of less than ±5 carriers is reached.

A similar differential demodulation DDEM and correlation- process COR within the frequency domain, but now with the CAZAC sequence component of the reference symbols and carried out over ±7 carrier shifts, supplies a first approximate frequency offset value. To be more precise, the different regions—each having the same sequence twice—are converted back into the original sequence and averaged (in EV2). Finally, a correlation is carried out with the result.

A precise value for the frequency deviation is achieved by means of a modified differential demodulation operation and fine correlation/calculation. In this case, only two correlation steps are carried out in the proximity of the exact constellation, and these two results are used to calculate the frequency deviation. The information from both the first approximate estimation and the fine correlation is subjected—in combination with the information from the rough estimation—to D/A conversion and filtered and used to correct the frequency reference for the mixing oscillator or the mixing oscillators.

The method steps and the corresponding mathematical description are quoted below as an example of the 1st mode. It must be taken into account that the carrier positions are in this case numbered according to an FFT range of 0 to 2047.

The frequency estimation and correction take place in two steps, rough and approximate evaluation and correction, it being possible to regard the latter as continuous frequency control (AFC). The differential demodulation of the received reference symbol $U_k$ takes place first of all over the whole length:

$$U_k = U_{k+1} U^*_k; \quad 65 \leq k \leq 1982$$

After that, the following calculations (or method steps) are carried out for the rough evaluation:

$$W_{M1,l} = \sum_{m=0}^{254} V_{M1,m+65} Y'_{M1,(m-l) \bmod 255}; \quad -25 \leq l \leq 25$$

$$W_{M2,l} = \sum_{m=0}^{254} V_{M2,m+1728} Y'_{M2,(m-l+63) \bmod 255}; \quad -25 \leq l \leq 25$$

$$W_{W,l} = \frac{1}{2}(W_{M1,l} + W_{M2,l})$$

The maximum of $|W_{W,l}|$ in the range $-25 \leq l \leq 25$ determines the value of $1_{W,MAX}$.

The following calculations (or method steps) are carried out for the approximate evaluation:

Splitting of the differentially demodulated values $V_{320} \ldots V_{1727}$ into 44 regions having a length of 32 (22 below and 22 above the centre);

Reconversion of the 44 regions in accordance with the above-described modulation scheme into the source CAZAC sequence, it being necessary to use the following phase shifts:

A ... D: 0
E ... H: $\pi/2$
I ... M: $\pi$
N ... Q: $-\pi/2$

Averaging of the corresponding values of all the regions; the result is 32 values wide;

Evaluation of $$W_{N,l} = \sum_{m=0}^{15} V_m c^*_{(m-l)mod16}; \quad -7 \leq l \leq 7$$

Search for $W_{N,max} = \max|W_n,1|$, which lies at $1_{N,max}$; it is possible to use this result to calculate $\Delta f = 1_{N,max} F_s$;

Selection of 44 regions having a length of 32 from the received reference symbol values $U_k$; 22 below and 22 above a new median, which is derived from the theoretical centre point by means of correction using $1_{N,max}$; definition of the new averaged values as $U'_k$. After this, evaluation using the context of FIG. 5 for $c^*_m$ and $c^*_{(m+1)mod16}$;

$$V'_l = U'_{l+1} U'^*_{l+1} + U'_{l+2} U'^*_l; \quad 0 \leq l \leq 16$$

$$B = \sum_{m=0}^{15} V'_m c^*_m$$

$$C = \sum_{m=0}^{15} V'_m c^*_{(m+1)mod16}$$

$$D = 2 W_{N,l_{N,max}} - B$$

$$E = 2 W_{N,l_{N,max}} - C$$

$$\Delta f = F_s \left( l_{N,max} + \frac{EC^* - DB^*}{EE^* + DD^*} \right)$$

A final result $\Delta f$ is calculated by averaging the 44 results: the final $\Delta f$ values of all the reference symbols are used, following D/A conversion and filtering, to control the reference oscillator or the reference oscillators in the RF section in the manner described above.

Corresponding basic formulae are used for the 2nd mode, it being necessary to adapt the parameters of the M sequence evaluation section (M1 ... M4 and corresponding correlation ranges) according to the frame structure illustrated in FIG. 2.

Coherent OFDM demodulation in the receiver requires phase correction of all the received and down-converted carrier signals. The correction is based on an estimation of the channel status. The following estimation operation is based on the evaluation of the reference symbols and of the pilot cells.

In order to reduce the effect of noise, the received values of the reference symbol can be averaged/filtered in two domains or dimensions: time and frequency. The final selection depends on the behaviour of the channel, which is characterized by the propagation time variation range and the rate of parameter changes.

In the 1st mode, adequate filtering can be realized just in the time domain (cut-off frequencies up to 20 Hz). For example, it is possible to use a filter having four times the length of the interspaces between the reference symbols or having ±2 interspaces from the relevant centre point.

Following filtering in the time domain, the values are interpolated in order to obtain the required reference values for all of the data symbols/values, use being made of a third order interpolation method with the (four reference points). Finally, the received data values are corrected in accordance with the deviation of the received reference values from the defined value.

In the 1st mode, the following method steps are carried out:

a) The deviations $ar_{ref,k}$ of the received amplitudes of the reference symbols and of the pilot cells and the phases $\phi r_{ref,k}$ of the stored values $a_{ref,k}$ and $\phi_{ref,k}$ must be calculated separately for each carrier:

$$r_{k,ref} = \frac{ar_{k,ref}}{a_{k,ref}}; \quad \Delta\varphi_{k,ref} = \varphi r_{k,ref} - \varphi_{k,ref}$$

The filtering of the deviations produces new deviation values:

$$r'_{k,ref} = \frac{1}{2.5}(-0.25 r_{k,ref-2d} + r_{k,ref-d} + r_{k,ref} + r_{k,ref+d} - 0.25 r_{k,ref+2d})$$

The same formula is used for the calculation of $\Delta'\phi_{k,ref}$, using the value $\Delta\phi_{k,ref}$ instead of $r_{k,ref}$.

The filtering is linear up to $\approx 20$ H, as a result of which low-frequency interference components of the mixing oscillator or mixing oscillators or channel rates of change up to this value are completely included.

The filtering operations require that a specific amount of received data be stored in the receiver, namely ⅔ of a frame for the filter proposed.

b) A third-order interpolation is used for the calculation of the relevant correction values $r_{k,i}$ and $\phi_{k,i}$ for the data symbols, i defining the position between the reference points "k,ref+d" and "k,ref". The formulae are given below (C0 ... C3 are intermediate results):

$$C_{0_{k,ref}} = r'_{k,ref}$$

$$C_{1_{k,ref}} = \frac{1}{6d}(-r'_{k,ref+2d} + 6 r'_{k,ref+d} - 3 r'_{k,ref} - 2 r'_{k,ref-d})$$

$$C_{2_{k,ref}} = \frac{1}{2d^2}(r'_{k,ref+d} - 2 r'_{k,ref} + r'_{k,ref-d})$$

$$C_{3_{k,ref}} = \frac{1}{2d^3}(r'_{k,ref+2d} - 3 r'_{k,ref+d} + 3 r'_{k,ref} - r'_{k,ref-d})$$

$$r_{k,i} =$$

$$C_{0_{k,ref}} + C_{1_{k,ref}} \cdot (i - ref) + C_{2_{k,ref}} \cdot (i - ref)^2 + C_{3_{k,ref}} \cdot (i - ref)^3$$

$$d = 25; \quad ref < i < ref + d.$$

The same formulae, but now using the phase values $\Delta'\phi_{k,ref}$ instead of $r'_{k,ref}$, are used for the calculation of $\Delta\phi_{k,i}$.

The results of both the reference symbol method and the pilot cell method with the same indices are averaged and yield the final correction values are $rres_{k,i}$ and $\Delta\phi res_{k,i}$.

The accuracy of the interpolation is better than 1% for the highest frequencies which can be processed using the filtering method.

The number of calculations which is necessary for the interpolation is quite high. In order to reduce the computing requirements, a set of correspondingly calculated interpolation curves can be stored in the receiver. In this case, it is necessary to calculate only the data for addressing such stored curves. The necessary storage capacity should not exceed 50 kbytes.

c) The received data values can be corrected by using the following formulae:

$$a_{k,j} = \frac{ar_{k,j}}{r_{ref_{k,j}}}; \; \varphi_{k,j} = \varphi_{k,j} - \Delta\varphi_{ref_{k,j}}$$

In the 2nd mode, the associated method steps are carried out in a corresponding manner.

The invention can be used for the transmission, in particular terrestrial transmission, for example of digital television, digital audio or other data signals.

What is claimed is:

1. Method for transmitting a digital signal having a multiplicity of modulated carriers comprising the steps of:
    arranging the digital signal into frames with a frame including a zero symbol and a time frequency phase reference symbol, which is modulated using CAZAC sequences, wherein within a frame at least one further reference symbol is transmitted which is modulated with at least one pseudorandom sequence having a greater length than any of the CAZAC sequences;
    transmitting the frames;
    receiving the frames;
    carrying out a rough synchronization by means of the zero symbol, and
    carrying out a rough synchronization by means of the zero symbol, and
    carrying out a further synchronization by evaluation of the other reference symbol.

2. Method according to claim 1, wherein the further reference symbol likewise has a time frequency phase reference symbol.

3. Method according to claim 1, wherein said digital signal is transmitted through a channel and wherein for providing a determination of the channel status and for subsequent channel correction, use is made of the reference symbols together with further special symbols or pilot cells defined by a carrier and a time slot or time symbol, which take up only some of the carriers for specific time periods.

4. Method according claim 1, wherein the zero symbol is split into a part having zero power and into a part which serves as the reference symbol.

5. Method according to claim 1 wherein the symbols are modulated by QPSK or QAM carriers.

6. Method according to claim 1, wherein the pseudorandom sequences are differentially encoded before the modulation, preferably QPSK modulation.

7. Method according to claim 1, wherein a maximum length is selected for the pseudorandom sequences, which may be M sequences.

8. Method according to claim 1 wherein the pseudorandom sequences are evaluated by using an FFT, differential demodulation and correlation.

9. Method according to claim 8 wherein the evaluation result using said FFT and a further evaluation result using CAZAC sequences are used for the frequency correction of at least one oscillator.

10. Method according to claim 9 wherein the evaluation-results are used to determine and correct deviations of the normal frequency of an oscillator or in order to correct deviations of a transmitter frequency with respect to a receiver-end frequency pattern or of an offset of the transmitter frequency.

11. Method according to claim 10 wherein once a given oscillator or frequency conversion accuracy has been achieved, the pseudorandom sequences continue to be evaluated but no longer have any effect provided a defined deviation is not exceeded.

12. Method for digital signal transmission in frames having a multiplicity of modulated carriers, a zero symbol and a time frequency phase reference symbol, comprising the steps of:
    modulating the signal using CAZAC sequences, wherein the time frequency phase reference symbol is also modulated by at least one pseudorandom sequence having a greater length than the CAZAC sequences;
    arranging the sequences having a greater length being arranged in the outer carriers at the lowest and at the highest carrier frequencies;
    performing rough synchronization by means of the zero symbol, and
    performing synchronization by evaluation of the time frequency phase reference symbol.

13. Device for decoding a digital signal which is transmitted in frames using a multiplicity of modulated carriers, a zero symbol and a time frequency phase reference signal which is modulated by CAZAC sequences, the device comprising:
    demodulation means for demodulating a received signal;
    a zero signal component detector means coupled to said demodulation means for detecting the zero symbol;
    an OFDM decoder means coupled to said demodulation means for decoding a carrier demodulated received signal;
    a digital synchronization evaluation means coupled to said demodulation means for evaluating an initially demodulated received signal, which are controlled by an output signal of the zero signal component detector means and which control the OFDM decoder means and which additionally evaluate either a further reference symbol which is modulated by at least one pseudorandom sequence having a greater length than any of the CAZAC sequences, or said time frequency phase reference signal, which is also modulated by at least one pseudorandom sequence having a greater length than any of the CAZAC sequences, these sequences having a greater length being arranged essentially in the outer carriers at a lowest and at a highest carrier frequencies.

14. Device according to claim 13 wherein the pseudorandom sequences are evaluated in said digital synchronization evaluation means using FFT circuitry, differential demodulation circuitry and correlation circuitry.

15. Method for digital signal transmission in frames having a multiplicity of modulated carriers and having a synchronization symbol which is spread over the bandwidth of the signal, the power of the signal being zero or virtually zero for a zero part of the duration of the synchronization symbol, comprising the steps of:
    using during a further time segment of a frame a modulation which differs from the modulation of the remaining signal part of that frame, for every other carrier, with half the effective symbol length;
    transmitting in the signal part of the synchronization symbol at least one bit sequence having optimum autocorrelation properties, the information sequence of the bit sequence being assigned to the carriers in order from the lowest to the highest frequency or vice versa;

performing a rough synchronization that can take place in a receiver on the basis of the part-symbol with zero power, and performing after the valuation of the received signal component of the synchronization symbol on the basis of the rough synchronization, a more precise determination of the time period of the symbol or several of such symbols.

16. Method according to claim 15 wherein the carriers are OFDM modulated and the length of the zero part corresponds approximately to half of the duration of the OFDM symbols.

17. Method according to claim 15 comprising the further step: selecting as said bit sequence a sequence having a length which is less than the maximum possible length and which is transmitted repeatedly.

18. Method according to claim 15 comprising the further step: including, transmission of multiples of said bit sequence which are variants of the same basic type and transmitting each variant at least twice.

19. Method according to claim 15 comprising the further step: transmitting, in the case of QPSK modulation, the bit sequence only in one subchannel wherein a data sequence is constant in the other subchannel.

20. Method according to claim 15 comprising the further step of transmitting, in the case of QPSK modulation, the bit sequence only in one subchannel, but with a different sign.

21. Method according to claim 15, comprising the further step of modulating in the case of QAM or multi-resolution QAM, the synchronization symbol at the lowest level, on QPSK basis.

22. Method according to claim 15 comprising the further step of transmitting, during the zero part, a reduced number of carriers with a total power so low that the detection of the zero component in the receiver is not significantly affected thereby.

23. Method according to claim 15 wherein the carriers are OFDM modulated, comprising the further step of selecting for the optimum selection of the relationships between the length of each, a given number of useful symbols per frame and a given sampling sequence, a length which differs slightly from a duration of the OFDM symbols is selected for the synchronization symbol, in which the zero component is somewhat shortened or lengthened.

24. Method according to claim 15 comprising the further steps of:

converting the synchronization symbol into a frequency domain representation;

complex-conjugate multiplying the synchronization symbol signal by a stored desired sequence; and transforming the result of the complex-conjugate multiplication back into a time domain representation, and using a resulting channel impulse response for the precise determination of the time period of the symbols.

25. Method according to claim 24 comprising the further steps of:

carrying out a correlation with the signal transformed into the frequency domain and the stored desired sequence, wherein the result represents information concerning the frequency deviation of the signal converted in the receiver at another frequency and controlling the oscillator of the frequency converter.

26. Method according to claim 24 comprising the further steps of:

subdividing the signal transformed into the frequency domain into sections corresponding to the arrangement of the transmitted sequences;

converting and averaging the part-results of the individual section to the format of a basic sequence, and carrying out a correlation with said basic sequence, to produce a result representing information concerning a frequency deviation of a receiver frequency conversion oscillator.

27. Method according to claim 24, comprising the further steps of including the phase values, determined for each individual carrier, of the synchronization symbol are included in differential modulation or demodulation as reference values for the useful information which is modulated onto the carriers, or, in the case of coherent differential modulation or demodulation, including the deviations from predetermined desired phase angles of the synchronization symbol in the correction of subsequently determined phase angles of the useful information.

28. Method according to claim 24, comprising the further steps of obtaining, by means of interpolation from the reference and correction values of adjacent carriers, the reference and correction values for the carriers not contained in the synchronization symbol.

29. Device for decoding a digital signal which is transmitted in frames having a multiplicity of modulated carriers and having a synchronization symbol component which is spread over the bandwidth of the signal, the power of the signal being zero or virtually zero before a zero part of the duration of the synchronization symbol, the device comprising:

demodulation means for demodulating a received signal;

a zero signal component detector means for detecting the zero part;

an OFDM decoder means coupled to said demodulation means for OFDM decoding a carrier demodulated received signal;

digital synchronization evaluation means coupled to said demodulation means for synchronizing an initially demodulated received signal, which are controlled by an output signal of the zero signal component detector means and which control the OFDM decoder means; and said synchronization symbol signal component being converted into frequency domain form in an FFT circuit in said digital synchronization evaluation means, then being complex-conjugate multiplied in a further stage of a desired sequence stored in the device and being transformed back into time domain form in an $FFT^{-1}$ stage, to thereby produce a resulting channel impulse providing a precise determination of a time period of said synchronization symbol component.

30. Method for digital signal transmission in frames having a multiplicity of modulated carriers and having an OFDM synchronization symbol which is spread over the bandwidth of the signal, the power of the signal being zero or virtually zero for a zero part of the duration of the synchronization symbol, comprising the steps of:

including during a further time segment, modulation which differs from the modulation in the remaining signal part by transmitting a bit formation which has a defined temporal sequence, and modulating onto a centrally positioned carrier and contains at least one sequence having optimum autocorrelation properties, and in that the spacing between the bits of the sequence corresponds to the time intervals for the sampling or oversampling of the OFDM synchronization symbol, or to a multiple of these time intervals.

31. Method according to claim 30 wherein one sequence corresponds to approximately a quarter of the length of the OFDM synchronization symbol.

32. Method according to claim 30, comprising the further step of transmitting the sequence twice wherein the sequence preferably has a length of 512-1.

33. Method according to claim 30 comprising the further step of arranging the spacing between the bits of the sequence corresponding to n times the value of the time intervals used in the oversampling of the OFDM symbol, or transmitting the values of the sequence are transmitted successively in each case n time with a defined sampling sequence.

34. Method according to claim 30 comprising the further steps of:

correlating the OFDM synchronization symbol signal with a stored desired sequence, to produce a result representing information concerning a frequency deviation of the signal converted in a receiver to another frequency,     applying said result to an oscillator of a frequency converter of said receiver,     wherein only every nth value of the sampling, which is carried out with the sequence unchanged, is used in the correlation, or n correlations being carried out with sequences offset by one to n sampling intervals, in the case of which only every nth value obtained is used, and only that result which has the highest peak value being used.

35. Method according to claim 34 comprising the further step of carrying out the correlations with sequences offset by one to n sampling intervals, in the case of which only every nth value obtained is used and the results of the n correlations are averaged.

* * * * *